United States Patent [19]

Ley et al.

[11] 4,250,070

[45] Feb. 10, 1981

[54] AQUEOUS DISPERSIONS, CONTAINING HYDRAZINE DERIVATIVES, OF CARBONYL-CONTAINING COPOLYMERS

[75] Inventors: Gregor Ley, Wattenheim; Erich Penzel, Ludwigshafen; Walter Rebafka, Eppelheim; Kaspar Bott, Wachenheim, all of Fed. Rep. of Germany

[73] Assignee: BASF Aktiengesellschaft, Fed. Rep. of Germany

[21] Appl. No.: 3,965

[22] Filed: Jan. 16, 1979

[30] Foreign Application Priority Data

Jan. 26, 1978 [DE] Fed. Rep. of Germany ....... 2803258

[51] Int. Cl.$^3$ ..................... C08L 25/18; C08L 29/12; C08L 29/00
[52] U.S. Cl. .......................... 260/29.6 MM; 525/376

[58] Field of Search ............. 260/29.6 MM, 29.6 MN, 260/45.9 NN; 525/376

[56] References Cited

U.S. PATENT DOCUMENTS

| | | | |
|---|---|---|---|
| 2,544,772 | 3/1951 | Andrieth et al. | 260/45.9 |
| 2,822,354 | 2/1958 | Uraneck et al. | 260/45.9 NN |
| 3,345,336 | 10/1967 | Kuhlkamp et al. | 260/63 |

*Primary Examiner*—V. P. Hoke
*Attorney, Agent, or Firm*—Keil & Witherspoon

[57] ABSTRACT

Aqueous dispersions of carbonyl-containing copolymers, which dispersions contain from 0.02 to 1 mole, per mole of carbonyl group, of organic hydrazine derivatives possessing 2 or more hydrazine radicals, and from 0.0002 to 0.02 mole, per mole of the hydrazine derivatives, of heavy metal ions give coatings, impregnations and finishes which are particularly easy to cross-link.

2 Claims, No Drawings

AQUEOUS DISPERSIONS, CONTAINING HYDRAZINE DERIVATIVES, OF CARBONYL-CONTAINING COPOLYMERS

Aqueous dispersions of carbonyl-containing copolymers have long been known. The main monomer present, as copolymerized units, in such copolymers may be, for example, an acrylic acid ester and/or methacrylic acid ester, a vinyl ester, eg. vinyl acetate and/or vinyl propionate, a vinyl halide, eg. vinyl chloride and/or vinylidene chloride, a vinyl-aromatic compound, especially styrene, and/or, where appropriate, a 1,3-diene, especially butadiene. The keto groups of the conventional carbonyl-containing copolymers are derived, for example, from copolymerized alkyl vinyl ketones, especially vinyl methyl ketones, vinyl ethyl ketone and/or vinyl n-butyl ketone, from copolymerized vinyl esters of aliphatic keto-monocarboxylic acids and/or keto-dicarboxylic acids, mostly of 4 to 8 carbon atoms, eg. of levulic acid, $\gamma,\gamma$-dimethyl-$\delta$-ketocaproic acid and acetoacetic acid, N-vinylamides of aliphatic ketocarboxylic acids of 4 to 8 carbon atoms and/or $\alpha,\beta$-monoolefinically unsaturated aldehydes of 3 or 4 carbon atoms, eg. acrolein, methacrolein, crotonaldehyde or cinnamaldehyde. Such copolymer dispersions can also contain added organic hydrazine derivatives, in particular polyfunctional carboxylic acid hydrazides, for example dihydrazides of aromatic or aliphatic carboxylic acids, eg. phthalic acid dihydrazide, isophthalic acid dihydrazide, terephthalic acid dihydrazide, oxalic acid dihydrazide and sebacic acid dihydrazide, or polyhydrazides derived from polycarboxylic acids (cf. German Laid-Open Application DOS No. 1,495,706). Such mixtures in general contain from 30 to 65, especially from 45 to 50, % by weight of copolymers of the above type and can be used in the paints and adhesives industries and for the treatment of leather, textiles and paper. The hydrazide component acts as a crosslinking agent and the crosslinking takes place rapidly at room temperature, especially after the film has been formed from the dispersions. However, a disadvantage of these known mixtures is, especially, that on storage free hydrazine is formed from the hydrazine derivatives by hydrolysis, and this product is objectionable because of its toxicity.

We have found that aqueous dispersions of carbonyl-containing copolymers which contain, per mole of carbonyl group, from 0.02 to 1 mole of organic hydrazine derivatives possessing 2 or more hydrazine radicals, exhibit advantageous properties if they contain from 0.0002 to 0.2 mole, per mole of the hydrazine derivatives, of heavy metal ions. The effect of the presence of heavy metal salts is, in particular, that on storage an objectionable amount of free hydrazine does not form in the aqueous dispersions, containing hydrazine derivatives, of the carbonyl-containing copolymers. Furthermore, these heavy metal salts do not adversely affect (ie. accelerate) the crosslinking reaction in the films formed from the mixtures, so that in general it suffices to heat substrates, coated, finished or impregnated with the mixtures, at comparatively low temperatures. It is surprising that coatings, finishes and impregnations produced using the novel mixtures do not exhibit reduced aging resistance or exhibit reduced light stability.

The aqueous dispersions of the carbonyl-containing copolymers of olefinically unsaturated monomers, employed in preparing the novel mixtures, can be produced in the conventional manner by emulsion copolymerization of carbonyl-containing monoolefinically unsaturated monomers with other olefinically unsaturated monomers. The proportion of the carbonyl-containing monomers, based on total monomers, is in most cases from 0.1 to 20, preferably from 2 to 15, % by weight. Monomers of particular interest are acrolein, diacetone-acrylamide, formylstyrene, vinyl alkyl ketones of 4 to 7 carbon atoms, especially vinyl methyl ketone, and/or acryloxy- and methacryloxy-alkyl-propanals of the general formula (I)

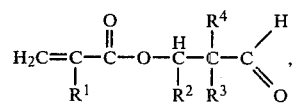

where $R^1$ is —H or —$CH_3$, $R^2$ is —H or is alkyl of 1 to 3 carbon atoms, $R^3$ is alkyl of 1 to 3 carbon atoms and $R^4$ is alkyl of 1 to 4 carbon atoms. Such acryloxy- and methacryloxy-alkyl-propanals can be prepared in accordance with the process of U.S. Patent Application Ser. No. 901,422 filed May 1, 1978 now U.S. Pat. No. 4,191,838 by esterification of $\beta$-hydroxyalkylpropanals of the general formula (II)

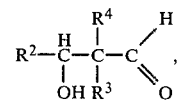

where $R^2$, $R^3$ and $R^4$ have the meanings given for the general formula (I), in the presence of inert diluents and of small amounts of sulfonic acids and mineral acids, at from 40° to 120° C., especially from 60° to 90° C. Further suitable monomers possessing keto groups are acrylamidopivalaldehyde, methacrylamidopivalaldehyde, 3-acrylamidomethyl-anisaldehyde, diacetone-acrylate, acetonyl acrylate, diacetone methacrylate, 2-hydroxypropylacrylate acetylacetate and butanediol acrylate acetylacetate. Preferred olefinically unsaturated comonomers for the preparation of the carbonyl-containing copolymer dispersions, these comonomers mostly being employed in amounts of from 80 to 99.9% by weight, preferably from 85 to 98% by weight, are the esters of acrylic acid and methacrylic acid with alkanols of 1 to 8, especially of 1 to 4, carbon atoms, eg. methyl alcohol, ethyl alcohol, isopropyl alcohol, isobutyl alcohol, n-butyl alcohol and 2-ethylhexyl alcohol and/or vinyl-aromatic monomers, especially styrene, and/or 1,3-dienes, especially 1,3-butadiene, and/or vinyl esters, mostly of saturated monocarboxylic acids of 1 to 12 carbon atoms, especially vinyl acetate, vinyl propionate, vinyl n-butyrate and vinyl laurate, and also vinyl halides, especially vinyl chloride and vinylidene chloride, and alkyl esters of monoolefinically unsaturated dicarboxylic acids, eg. di-n-butyl maleate and di-n-butyl fumarate. The carbonyl-containing copolymers may in addition contain, as copolymerized units, small amounts—mostly from 0.5 to 10% by weight, especially from 0.5 to 5% by weight, based on total monomers—of $\alpha,\beta$-monoolefinically unsaturated monocarboxylic acids and/or dicarboxylic acids, mostly of 3 to 5 carbon atoms, and/or of their N-unsubstituted or N-substituted amides, especially acrylic acid, methacrylic acid, fumaric acid, itaconic acid, acrylamide, methacrylamide, N-methylacrylamide, N-methylolacrylamide, N-n-butoxymethylmethacrylamide, maleimide and maleic acid diamide, and also monoolefinically unsaturated sulfonic acids, especially vinylsulfonic acid and methacrylamidopropanesulfonic acid. Acrylonitrile and/or methacrylonitrile may also be used as comonomers, mostly in amounts of from 5 to 40% by weight, especially from 10 to 30% by weight, based on total monomers. The aqueous dispersions of the carbonyl-containing copolymers can be prepared in the conventional manner and can contain the conventional dispersants, especially anionic and/or non-ionic emulsifiers, in the conventional amounts, ie. mostly from 0.2 to 3% by weight, based on the amount of the copolymer. Examples of such emulsifiers are sodium dialkylsulfosuccinates, sodium salts of sulfated oils, sodium salts of alkylsulfonic acids, sodium, potassium and ammonium alkyl-sulfates, alkali metal salts of sulfonic acids, oxyethylated $C_{12}$—$C_{24}$-fatty alcohols and oxyethylated alkylphenols, and also oxyethylated fatty acids and/or fatty amides, and sodium salts of fatty acids, eg. sodium stearate and sodium oleate. Instead of the anionic emulsifiers and, where appropriate, additionally to the non-ionic emulsifiers of the above type, the aqueous dispersions of the carbonyl-containing copolymers may in some cases also contain conventional cationic emulsifiers, eg. $C_{12-18}(C_{1-4})_3$-ammonium chlorides. The preparation of aqueous dispersions of copolymers of acryloxy- or methacryloxy-alkylpropanals of the above general formula (I) with the main monomers of the type mentioned above, which employs conventional polymerization in aqueous emulsion using emulsifiers of the stated type, is in most cases carried out at from 40° to 90° C., using, in most cases, from 0.05 to 2% by weight, based on total monomers, of conventional free radical polymerization initiators, especially hydrogen peroxide and/or persulfates, eg. ammonium persulfate, potassium persulfate and sodium persulfate. Mixtures of hydrogen peroxide and/or persulfates of the stated type with reducing agents, eg. sodium formaldehydesulfoxylate, ie. conventional redox catalysts, may also be used.

The amount of the organic hydrazine derivatives should be from 0.02 to 1, preferably from 0.05 to 0.5, mole per mole of carbonyl groups contained in the copolymers. The organic hydrazine derivatives should contain 2 or more hydrazine radicals and can advantageously be derived from saturated aliphatic dicarboxylic acids. Dihydrazides of aliphatic carboxylic acids of 2 to 10 carbon atoms are of particular interest. Suitable dihydrazides of this type are, in particular, oxalic acid dihydrazide, malonic acid dihydrazide, succinic acid dihydrazide, glutaric acid dihydrazide, adipic acid dihydrazide and/or sebacic acid dihydrazide. Further very suitable compounds are polyhydrazides of carbonic acid, eg. carbonic acid dihydrazide and compounds of the general formula III

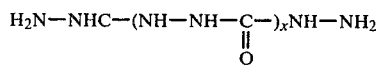

where x is from 1 to 5, preferably from 1 to 3, and bis-semicarbazides, especially aliphatic and cycloaliphatic bis-semicarbazides of the general formula IV

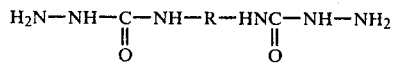

where —R— is a straight or branched aliphatic radical of 2 to 7 carbon atoms or a carbocyclic radical of 6 to 8 carbon atoms, eg. o-, m- or p-phenylene or toluylene or cyclohexylidene or methylcyclohexylidene. Polyhydrazides of aromatic polycarboxylic acids, eg. the dihydrazides of phthalic acid, terephthalic acid and isophthalic acid, and the dihydrazides, the trihydrazide and the tetrahydrazide of pyromellitic acid, may also be used. Examples of other suitable compounds are polyhydrazides of polyacrylic acids which contain 2 or more hydrazide groups, in most cases from 20 to 100 hydrazide groups, per molecule, trihydrazides, eg. nitrilotriacetic acid trihydrazide, and tetrahydrazides, eg. ethylenediaminetetraacetic acid tetrahydrazide. Further possible hydrazides are dihydrazino- and trihydrazino-triazine, thiocarbohydrazide and N,N'-diaminoguanidine, as well as hydrazinopyridine derivatives of the type of 2-hydrazino-pyridine-5-carboxylic acid hydrazide, 3-chloro-2-hydrazinopyridine-5-carboxylic acid hydrazide, 6-chloro-2-hydrazinopyridine-4-carboxylic acid hydrazide and 2,5-dihydrazinopyridine-4-carboxylic acid, and bis-thiosemicarbazides as well as bis-hydrazines of alkylene-bis-acrylamides, dihydrazinoalkanes and dihydrazines of aromatic hydrocarbons, eg. 1,4-dihydrazinobenzene, 1,3-dihydrazinobenzene and 2,3-dihydrazinonaphthalene, as well as dihydrazides of monoolefinically unsaturated dicarboxylic acids, eg. maleic acid dihydrazide, fumaric acid dihydrazide and itaconic acid dihydrazide.

The mixtures of the aqueous dispersions of the carbonyl-containing copolymers and the organic hydrazine derivatives possessing 2 or more hydrazine radicals should contain from 0.0002 to 0.02 mole of the heavy metal ions (added in the form of heavy metal salts) per mole of the hydrazine derivatives. In general, water-soluble heavy metal salts, in particular chlorides, sulfates and acetates, are preferred. Suitable heavy metal salts are, in particular, water-soluble salts of copper, zinc, iron, chromium, manganese, lead, vanadium, cobalt and/or nickel. Water-soluble salts of copper, iron, manganese, vanadium and/or cobalt are of particular interest. Specific examples are copper-II chloride, copper-II sulfate, zinc sulfate, iron-III chloride, cobalt-II chloride, manganese-II chloride, lead-II acetate, nickel-II chloride, chromium nitrate, vanadyl acetate and chromium-III sulfate.

In the preparation of the aqueous dispersions of carbonyl-containing copolymers, wherein the dispersions contain organic hydrazine derivatives and heavy metal ions or salts, the heavy metal salts are preferably added in the form of previously prepared aqueous solutions, and are in general introduced after the polymerization and in most cases together with, or after, the hydrazine derivatives.

The novel dispersions may be used to produce films which even at room temperature are so heavily crosslinked that they are virtually no longer dissolved, but only slightly swollen, by solvents such as dimethylformamide. This is also true of impregnations, coatings and finishes which may or may not be pigmented with conventional pigments.

The novel dispersions may for example be employed as adhesive raw materials, as additives for hydraulic binders, as binders for paper-coating compositions and nonwovens, and as coatings, finishes and/or impregnating agents, for example for sheet-like materials such as woven fabrics, knitted fabrics or leather.

In the Examples which follow, parts and percentages are by weight.

EXAMPLE 1

A mixture of 7.3 parts of a 35% strength aqueous solution of the sodium salt of a sulfated reaction product of isooctylphenol with 25 moles of ethylene oxide, and a solution of 2.5 parts of potassium persulfate in 220 parts of water is heated in a reaction vessel equipped with a stirrer, thermometer and feed vessel. Into this solution is run, over 1½ hours, an emulsion of 375 parts of methyl acrylate, 90 parts of n-butyl acrylate, 10 parts of acrylic acid and 25 parts of acrolein in a mixture of 21.5 parts of a 35% strength aqueous solution of the above emulsifier and 152 parts of water. At the same time, a solution of 2.5 parts of potassium persulfate in 100 parts of water is run in separately. After all has been run in, the dispersion obtained is kept at 85° C. for 2½ hours.

After cooling, 200 parts of a 17.5% strength aqueous solution of a mixture of 25% of succinic acid dihydrazide, 50% of glutaric acid dihydrazide and 25% of adipic acid dihydrazide are added. The pH is now brought to 4–5 with ammonia, after which 0.06 part of copper sulfate is added.

The dispersion thus obtained can be stored at room temperature virtually indefinitely without objectionable amounts of hydrazine being formed therein. The dispersion may, for example, be used for dressing leather, for which purpose the conventional pigments, in the conventional amounts, may be added. A film prepared from the dispersion and dried at room temperature, when stored for 1 day in dimethylformamide, picks up 210%, of its weight of the said solvent. If the pH of the dispersion is brought to 8–9 with ammonia before preparing the film, the resulting film, after drying at room temperature and then storing in dimethylformamide, only picks up 110%, of its weight, of the said solvent.

EXAMPLE 2

The procedure described in Example 1 is followed, but a pre-emulsified mixture of 275 parts of n-butyl acrylate, 165 parts of methyl methacrylate, 10 parts of acrylic acid and 50 parts of β-hydroxypropyl acrylate acetylacetate is polymerized, and after the emulsion polymerization the pH of the dispersion is brought to 4–5 with ammonia. 100 parts of a 17.5% strength aqueous solution of the dicarboxylic acid dihydrazide mixture described in Example 1 and 0.02 part of iron-II sulfate are added to the dispersion. Even after storage for several weeks at room temperature the dispersion shows no free hydrazine. The dispersion may be used for the bonding of nonwovens. A film prepared from the dispersion picks up 370% of solvent after 1 day's storage in dimethylformamide. If the dispersion is allowed to form a film at pH 8–9, the dimethylformamide pick-up is 340%.

EXAMPLE 3

The procedure described in Example 1 is followed, but a pre-emulsified mixture of 385 parts of 2-ethylhexyl acrylate, 85 parts of acrylonitrile, 15 parts of acrylic acid and 15 parts of vinyl methyl ketone is polymerized. 150 parts of a 10% strength aqueous solution of isophthalic acid dihydrazide and 0.1 part of copper sulfate are added to the resulting dispersion. The pH of the mixture is brought to 4–5 with ammonia. Even after several weeks' storage at room temperature, the dispersion shows no significant free hydrazine content. The dispersion can be used to produce dispersion adhesives. Films produced from the dispersion, when dried at room temperature and stored in dimethylformamide, pick up 180% of this solvent.

EXAMPLE 4

Using the method described in Example 1, a dispersion is prepared, starting from a pre-emulsified mixture of 250 parts of isobutyl acrylate, 160 parts of vinyl acetate, 15 parts of acrylic acid and 75 parts of butanediol 1-acrylate 4-acetylacetate (the amount of water and the emulsifier being as in Example 1). After the dispersion has cooled, 150 parts of a 17.5% strength aqueous solution of the dicarboxylic acid dihydrazide mixture described in Example 1 and 0.08 part of manganese-II sulfate are added. The pH of the dispersion is brought to 4–5. The dispersion can be stored at room temperature for several weeks without evolution of free hydrazine. It can be used as a binder for pigment printing in the textile industry and gives films which, when dried at room temperature and stored for 1 day in dimethylformamide, pick up 670%, of their weight, of the said solvent.

EXAMPLE 5

The preparation of the dispersion is carried out as described in Example 1, but a pre-emulsified mixture of 460 parts of ethyl acrylate, 25 parts of acrylic acid and 15 parts of acrolein is used (the amount of water and the emulsifier being as in Example 1). The pH of the dispersion is brought to 4–5 and 40 parts of a 15% strength aqueous solution of ethylenediaminetetraacetic acid tetrahydrazide and 0.06 part of copper sulfate are added. The mixture can be used to dress leather. Films prepared therefrom, when dried at room temperature and stored in dimethylformamide, pick up 260%, of their weight, of dimethylformamide. If the pH of the mixture is brought to 9–10 before preparing the films, the dimethylformamide pick-up of films produced from the mixture and dried at room temperature is only 180% of the film weight.

EXAMPLE 6

The procedure described in Example 1 is followed, but a monomer mixture, pre-emulsified by the method described, of 325 parts of ethyl acrylate, 135 parts of methyl methacrylate, 15 parts of methacrylic acid and 25 parts of vinyl methyl ketone is employed. 80 parts of a 17.5% strength aqueous solution of adipic acid dihydrazide and 0.04 part of copper sulfate are added to the dispersion obtained. Even after several weeks' storage at room temperature, no free hydrazine is formed in the dispersion. Films prepared from the dispersion, after drying at room temperature, pick up 315%, of their weight, of dimethylformamide. The dispersion may be used to bond nonwovens.

EXAMPLE 7

A mixture of 5.7 parts of a 35% strength aqueous solution of the sodium salt of a conventionally sulfated reaction product of p-isooctylphenol with 25 moles of ethylene oxide, 2 parts of potassium persulfate and 200 parts of water is introduced into a reaction vessel equipped with a stirrer, thermometer and feed vessels. The following are run simultaneously into the mixture from separate feed vessels, in the course of 2½ hours, at 85° C.: (a) a mixture of 400 parts of ethyl acrylate, 8 parts of acrylic acid and 40 parts of dimethylpentenal emulsified in 143 parts of water (the emulsifier being 17.1 parts of the sulfated isooctylphenol/ethylene oxide adduct) and (b) a solution of 2 parts of potassium persulfate in 80 parts of water. After completion of the addition, the reaction mixture is kept at 85° C. for a further 2½ hours, and when it has cooled the pH is brought to 4–5. 160 parts of a 17.5% strength aqueous solution of the dicarboxylic acid dihydrazide mixture described in Example 1 and 0.06 part of copper-II sulfate are then added. The resulting dispersion can be stored at room temperature for several weeks without formation of free hydrazine. The dispersion can be used to dress leather. Films prepared from the dispersion, when stored in dimethylformamide at room temperature, pick up 730%, of their weight, of the said solvent.

EXAMPLE 8

The procedure described in Example 1 is followed, but a pre-emulsified monomer mixture of 150 parts of styrene, 312.5 parts of n-butyl acrylate and 37.5 parts of dimethylacrolein is used. After cooling, 80 parts of a 17.5% strength aqueous solution of succinic acid dihydrazide and 0.05 part of cobalt sulfate are added to the dispersion. Even after several weeks' storage at room temperature, the dispersion contains no free hydrazine. The dispersion can be used for coating paper. Films prepared from the dispersion, when dried at room temperature, pick up 260%, of their weight, of dimethylformamide.

EXAMPLE 9

The procedure described in Example 1 is followed, but starting from a pre-emulsified monomer mixture of 300 parts of 2-ethylhexyl acrylate, 150 parts of styrene and 50 parts of diacetone-acrylamide. When the dispersion has cooled, the pH is brought to 4–5 and 80 parts of a 17.5% strength aqueous solution of glutaric acid dihydrazide and 0.06 part of copper sulfate are added. The resulting dispersion shows no free hydrazine even after several weeks' storage at room temperature. The dispersion can be used for strengthening spun-bonded nonwovens. Films prepared from the dispersion, when dried at room temperature and stored in dimethylformamide, pick up 110%, of their weight, of the said solvent.

EXAMPLE 10

A mixture of 170 parts of water, 5.7 parts of a 35% strength aqueous solution of the sodium salt of the sulfated reaction product of p-isooctylphenol with 25 moles of ethylene oxide and 2 parts of potassium persulfate are introduced into a reaction vessel equipped with a stirrer, thermometer and feed vessels. The mixture is heated to 85° C. and the following are added simultaneously, from separate vessels, in the course of 2½ hours: (a) a mixture of 240 parts of methyl acrylate, 112 parts of styrene, 8 parts of methacrylic acid and 40 parts of cinnamaldehyde emulsified in 17.2 parts of the 35% strength emulsifier solution and (b) a solution of 2 parts of potassium persulfate in 80 parts of water. After all has been added, the reaction is allowed to proceed for a further 2½ hours at 90° C. The mixture is then cooled, the pH is brought to 4–5 and 140 parts of a 17.5% strength aqueous solution of glutaric acid dihydrazide and 0.04 part of copper sulfate are added. The resulting dispersion can be stored for several weeks at room temperature without formation of free hydrazine. The dispersion can be used as a raw material for pressure-sensitive adhesives. Films prepared from the dispersion, when dried at room temperature and stored in dimethylformamide, pick up 900%, of their weight, of the said solvent.

EXAMPLE 11

The procedure described in Example 1 is followed, but 153.6 parts of water and 7.14 parts of the 35% strength emulsifier solution described in Example 1 are used in the initial mixture. 390 parts of vinyl propionate, 75 parts of t-butyl acrylate and 7 parts of 3-acrylamidomethylanisaldehyde are emulsified in 200 parts of water by means of 5 parts of a reaction product of p-n-octylphenol with 20 moles of ethylene oxide and 64.3 parts of a 35% strength aqueous solution of the sodium salt of a sulfated reaction product of isooctylphenol with 25 moles of ethylene oxide. The initiator solution used consists of 2.5 parts of potassium persulfate in 100 parts of water. The pH is brought to 6 with ammonia. An aqueous slurry of 22.8 parts of hexamethylene-bis-semicarbazide and 0.075 part of vanadium nitrate ($V(NO_3)_3$) is added to the dispersion. Even after several weeks' storage, the dispersion shows no free hydrazine. A film prepared from the dispersion, after 1 day's storage in dimethylformamide, picks up 280% of the said solvent.

EXAMPLE 12

2,219 parts of water, 10% of the monomer emulsion and 10% of the initiator solution are initially introduced into an autoclave equipped with a stirrer, thermometer and feed vessels. The monomer emulsion contains 3,750 parts of butadiene, 5,250 parts of styrene, 2,500 parts of n-butyl acrylate and 1,000 parts of acrylamidopivalaldehyde, emulsified by means of 469 parts of a 40% strength aqueous solution of sodium lauryl-sulfate. The initiator solution contains 125 parts of potassium persulfate in 5,000 parts of water. The initial charge is heated to 80° C. and the feeds are run continuously into the reactor over 4 hours. The reaction mixture is then allowed to polymerize for a further 3 hours, after which it is cooled, the pressure is let down and the dispersion is run off. The pH is brought to 8 with ammonia. 313 parts of carbonic acid bis-hydrazide and 5.3 parts of zinc sulfate are stirred into the dispersion. Even after several weeks' storage at room temperature, no free hydrazine is detectable in the dispersion. The dispersion may be used for the bonding of nonwovens. A film prepared from the dispersion picks up 350% of solvent after 1 day's storage in dimethylformamide.

EXAMPLE 13

The procedure described in Example 12 is followed. 7,500 parts of vinyl chloride, 3,125 parts of iso-butyl acrylate and 1,875 parts of formylstyrene are emulsified by means of 625 parts of a 40% strength aqueous sodium laurylsulfate solution in 5,000 parts of water. After completion of the polymerization, the pH is brought to 7 with ammonia and 1,659 parts of oxalic acid dihydrazide and 45.3 parts of zinc sulfate are stirred in. Even after several weeks' storage at room temperature, no free hydrazine is detectable. A film prepared from the dispersion picks up 180% of solvent after 1 day's storage in dimethylformamide.

EXAMPLE 14

The procedure described in Example 12 is followed. 10,500 parts of vinylidene chloride, 625 parts of methyl acrylate, 125 parts of acrylic acid and 1,250 parts of acetonyl acrylate are emulsified by means of 625 parts of a 40% strength aqueous sodium lauryl-sulfate solution in 5,000 parts of water. After completion of the polymerization, the pH is brought to 7 with ammonia. 47 parts of toluylene-bis-semicarbazide and 0.28 part of chromium sulfate are then stirred in. The dispersion may be used for coating paper. Even after several weeks' storage at room temperature, no free hydrazine is detectable. A film prepared from the dispersion picks up 540% of solvent after 1 day's storage in dimethylformamide.

EXAMPLE 15

1,000 parts of vinyl acetate, 400 parts of polyvinyl alcohol (88% hydrolyzed; viscosity of the 40% strength solution: 25 mPa.s), 200 parts of nonylphenol oxyethylated with 20 moles of ethylene oxide, 20 parts of sodium acetate and 6,500 parts of water are introduced into an autoclave equipped with a stirrer and thermostatic control. The charge is then heated to 55° C. and ethylene is forced in up to a pressure of 40 bar. This pressure is maintained during the subsequent polymerization. The polymerization is started by means of a solution of 40 parts of potassium persulfate in 2,000 parts of water and a solution of 40 parts of sodium bisulfite in 2,000 parts of water. These two solutions are run in separately over 4 hours. In addition, a mixture of 7,000 parts of vinyl acetate and 500 parts of acryloxypivalaldehyde is introduced into the autoclave continuously over 3 hours. On completion of the addition, the polymerization is continued for 1 hour at 55° C. The reactor is then cooled, the pressure is let down and the dispersion is run off. Analysis shows a content of polymerized ethylene units of 15%. 250 parts of bis-semicarbazide of the formula

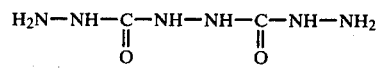

and 2.75 parts of chromium sulfate are stirred into the dispersion. The resulting dispersion may be used for the coating of leather. No free hydrazine is detectable even after several weeks' storage. A film prepared from the dispersion picks up 620% of solvent after 1 day's storage in dimethylformamide.

We claim:

1. An aqueous dispersion of a copolymer of olefinically unsaturated monomers containing keto and/or aldehyde

groups, which dispersion contains as a crosslinking agent for the keto and/or aldehyde groups of the copolymer from 0.02 to 1 mole of an organic hydrazine derivative from the group consisting of dihydrazides of aliphatic dicarboxylic acids of 2 to 10 carbon atoms and bis-semi-carbazides of the general formula

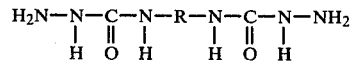

in which R is an aliphatic radical of 2 to 7 carbon atoms or a carbocyclic radical of 6 to 8 carbon atoms, and from 0.0002 to 0.02 mole of heavy metal ions per mole of the hydrazine derivative.

2. The dispersion of claim 1 which contains from 0.0002 to 0.02 mole of copper, iron, manganese, vanadium, zinc, lead and/or cobalt ions per mole of a dihydrazide of an aliphatic dicarboxylic acid of 2 to 10 carbon atoms.

* * * * *